US008341050B2

(12) United States Patent
Begen

(10) Patent No.: US 8,341,050 B2
(45) Date of Patent: Dec. 25, 2012

(54) PROOF OF MAILING

(75) Inventor: Geoffrey C. Begen, Lake Forest, CA (US)

(73) Assignee: Stamps.com, Los Angeles, CA (US)

( * ) Notice: Subject to any disclaimer, the term of this patent is extended or adjusted under 35 U.S.C. 154(b) by 662 days.

(21) Appl. No.: 12/337,443

(22) Filed: Dec. 17, 2008

(65) Prior Publication Data

US 2010/0153252 A1     Jun. 17, 2010

(51) Int. Cl.
*G06Q 40/00*     (2012.01)
(52) U.S. Cl. ............................................. 705/35; 705/60
(58) Field of Classification Search ................. 705/35, 705/60
See application file for complete search history.

(56) References Cited

U.S. PATENT DOCUMENTS

| | | | |
|---|---|---|---|
| 2002/0002590 A1* | 1/2002 | King et al. ................. | 709/206 |
| 2002/0143880 A1* | 10/2002 | Sansone et al. ............. | 709/206 |
| 2004/0088266 A1* | 5/2004 | Briley et al. ................. | 705/401 |
| 2006/0143141 A1* | 6/2006 | Amonette et al. ........... | 705/406 |
| 2006/0253405 A1* | 11/2006 | Nirenberg ................... | 705/401 |
| 2007/0110276 A1* | 5/2007 | O'Connell et al. ........... | 382/101 |
| 2007/0179902 A1* | 8/2007 | John ........................... | 705/62 |
| 2007/0203901 A1* | 8/2007 | Prado et al. ................. | 707/5 |
| 2008/0104176 A1* | 5/2008 | Agrawal et al. .............. | 709/206 |

OTHER PUBLICATIONS

Mail Tracking & Reporting, USPS—Mail Tracking and Reporting—How Confirm Service Works https://mailtracking.usps.com/mtr/resources/confirm/howWorks.pge Feb. 26, 2009, pp. 1-2.
U.S. Appl. No. 09/947,952, filed Sep. 6, 2001, status—abandoned.
U.S. Appl. No. 12/165,105, filed Jun. 30, 2008, status—pending.

\* cited by examiner

*Primary Examiner* — Jagdish Patel
*Assistant Examiner* — Kevin Poe
(74) *Attorney, Agent, or Firm* — Convergent Law Group LLP

(57) ABSTRACT

Methods and systems for providing a proof of mailing service include receiving from a user a designation of a recipient to receive an item to be mailed, and receiving a free-form description of the item. Postage indicia is printed bearing an amount of postage for a mail piece containing the item. In response to the mail piece being processes by a postal authority, a transmission from the postal authority containing a scanned image of the mail piece is received. The recipient is then sent a notification that the item has been mailed, and the notification includes the free-form description of the item and access to the scanned image.

22 Claims, 4 Drawing Sheets

PROOF OF MAILING

BACKGROUND OF THE INVENTION

When a sender ships a physical item through a shipping vendor to a recipient who is anxious to receive the item, the recipient will typically want to know when the item was shipped. One antiquated way for the recipient to determine shipping status is for the recipient to simply call the shipping vendor requesting the shipping status until the day the recipient receives the item, which is inefficient and troublesome for the both the recipient and the shipping vendor.

Shipping vendors typically resolve this problem by providing a tracking service that provides some type of electronic proof that the vendor shipped the item. However, traditional tracking services provided by shipping vendors, such as UPS and FEDEX, generally only provide the sender a receipt that an item was sent on a particular date or at the time of shipment. Currently, when a user purchases items over the Internet, the user may receive via e-mail a link to track shipment of their packages, including when the item was shipped. The recipient typically has to wait until the item is delivered to verify the content.

Track & Confirm™ by email is an online feature that allows the United States Postal Service® (USPS) to send delivery status information on a sender's mail piece. There are two options: email all activity to-date or email all future activity. Email all activity to-date will provide a single email to each recipient stating the current delivery status information. Email all future activity will generate an email any time the USPS receives a delivery or delivery related event (such as attempted, refused, returned to sender, or forwarded).

While conventional shipping vendors can provide electronic tracking notices that a mail piece, including a package, has been sent from a sender to a recipient, conventional electronic tracking notices are lacking in that they fail to allow the recipient to verify contents of the mail piece prior to receipt.

BRIEF SUMMARY OF THE INVENTION

Methods and systems for providing a proof of mailing service include receiving from a user a designation of a recipient to receive an item to be mailed, and receiving a free-form description of the item. Postage indicia is printed bearing an amount of postage for a mail piece containing the item. In response to the mail piece being processed by a postal authority, a transmission from the postal authority containing a scanned image of the mail piece is received. The recipient is then sent a notification that the item has been mailed, and the notification includes the free-form description of the item and access to the scanned image.

According to the exemplary embodiments, the notification sent to the recipient serves as proof that an item has been mailed, and the free-form description and the scanned image allow the recipient to verify described contents of the mail piece prior to delivery and receipt of the mail piece and the item therein. The recipient may receive the scanned image in an e-mail or accesses the scanned image via a link.

DETAILED DESCRIPTION OF THE INVENTION

The present invention relates to a system and method for providing recipients with proof of mailing of an item via a postal authority. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Exemplary embodiments provide methods and systems for providing a postage indicia printing application with a "Proof of Mailing" feature. When a person wants to mail an important item, such as a check, for example, to a recipient using the postage indicia printing application (e.g., client software from Stamps.com®), the person selects a "Proof of Mailing" option in the postage indicia printing application. Currently, postal authorities, such as the United States Postage Service (USPS), have the ability to scan images of the mail pieces and store the scanned images of the mail pieces in a database. The scanned mail pieces are acquired from the USPS by a postage indicia service, such as Stamps.com®. Once the mail piece has been mailed and scanned, the postage indicia service obtains the scanned mail piece from the USPS, and generates and sends a notification to the recipient indicating that the item is in the mail. The notification includes a free-form description of the mailed item and may also contain access to the copy of scanned mail piece.

Figure 1:
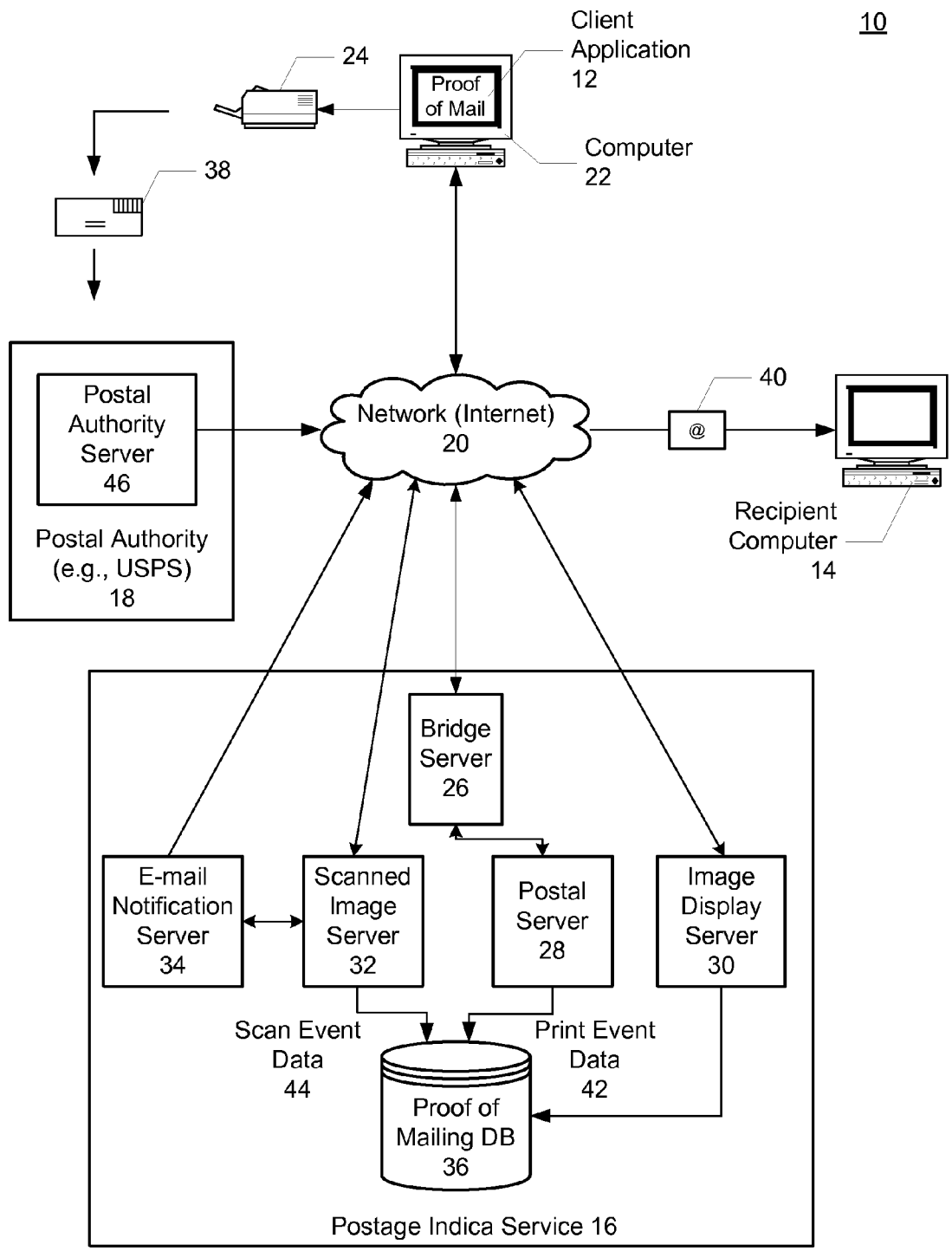
FIG. 1 is a block diagram illustrating an exemplary embodiment of a postage indicia system in which a method for providing a recipient with proof of mailing may be implemented.

FIG. 1 is a block diagram illustrating an exemplary embodiment of a postage indicia system in which a method for providing a recipient with proof of mailing may be implemented. The postage indicia system 10 includes a client application 12, a recipient computer 14, a postage indicia service 16, and a postal authority 18, all of which are coupled to a network 20, such as the Internet.

The client application 12 runs on an end-user's computer 22 and communicates with the postage indicia service 16 over the network 20 using either a dial-up or broadband connection. The postage indicia system 16 provides network-based postage solutions that enable customers to buy and print postal authority approved postage using the client application 12 executing on the user's computer 22, an inkjet or laser printer 24, and a network connection. According to the exemplary embodiment, the term postal authority 18 refers to any government run or sponsored organization that delivers mail, such as the United States Postal Service (USPS). Alternatively, the exemplary embodiment could be adapted to apply to private delivery companies as well.

After a user downloads and installs the client application 12 or accesses the application via a browser and creates a user account, the client application 12 communicates with servers in the postage indicia service 18 and may provide the user with different options for printing postage. One option may enable the user to print postage on labels, in which case a return address may not be required to print postage. Another option may enable the user to print postage on envelopes, postcards, flyers and labels, while a shipping labels option may enable the user to print shipping labels for packages and thick envelopes. For internet postage, a delivery address may be required, and for shipping labels, both a delivery and return address may be required. USPS regulations may require that the date printed on the postage and shipping labels match the actual date that the mail is collected.

The postage indicia service 16 may include a bridge server 26, a postal server 28, an image display server 30, a scanned image server 32, an e-mail notification server 34, and a proof of mailing database 36. The bridge server 26 may handle all user transactions and sends postal-related transactions to the postal server 28.

The postal server 28 may provide secure services to the client application 12 and the bridge server 26, including client authentication, postage purchase, and indicia data generation services. Client transactions may be encrypted using SSL. The postal server 28 may host a Postal Security Device (not shown) that insures Federal Information Processing Standards compliant security, and insures non-repudiation on postage purchase and indicia data generation services.

In operation, the user invokes the client application 12 and logs into the postage indicia service 16 using a username and password. When the request for authentication is received by the bridge server 26, the bridge server 26 validates the user name and password before forwarding the request to the postal server 28. In response, the postal server 28 opens a session between the postal server 28 and the bridge server 26, which in turn, is used by a session between the bridge server 26 and the client application 12 linked to the client account. After the user is authenticated, the user may request a print postage operation within the client application 12. The client application 12 then displays the print postage options for user selection, including an option to select "Proof of Mailing".

Figure 2:
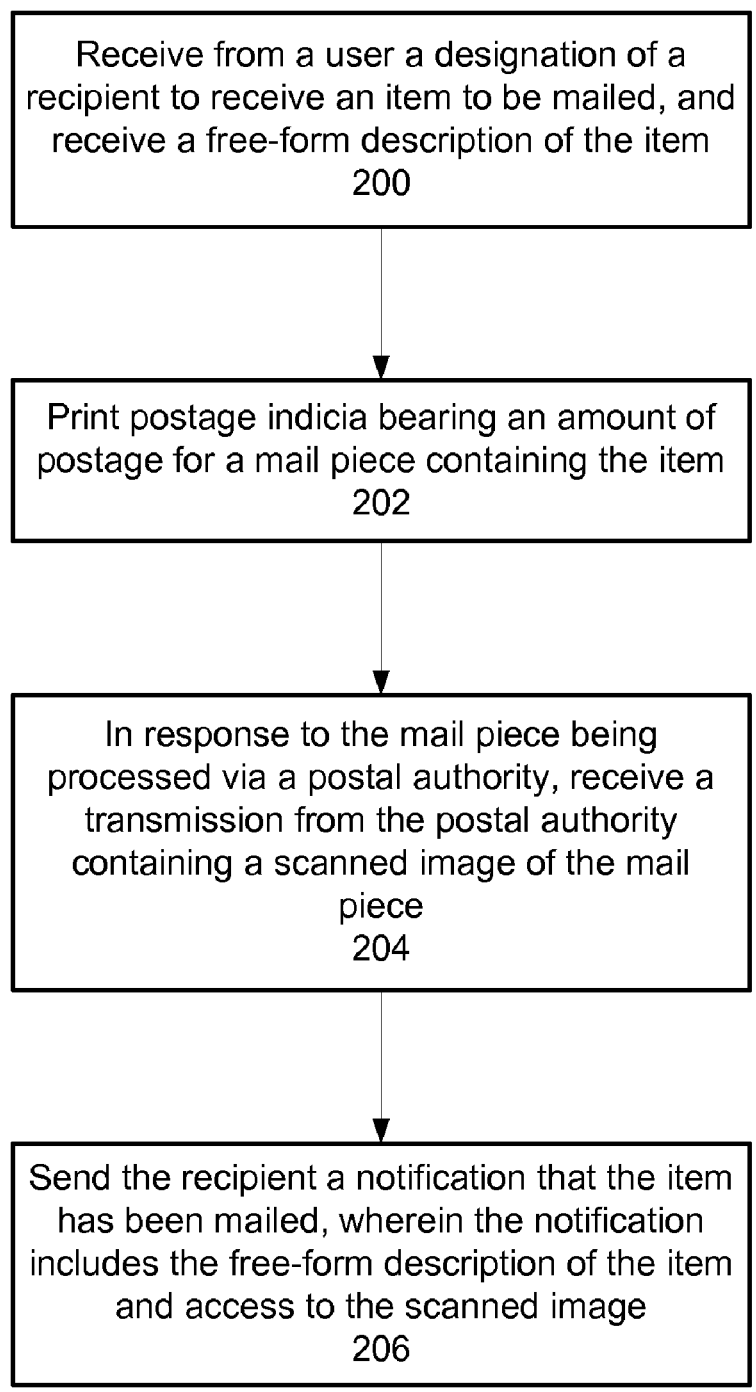
FIG. 2 is a flowchart illustrating a process for providing users of postage indicia printing applications and their recipients with verifiable proof of mailing.

FIG. 2 is a flowchart illustrating a process for providing users of postage indicia printing applications and their recipients with verifiable proof of mailing. The process may begin by receiving from a user a designation of a recipient to receive an item to be mailed, and receiving a free-form description of the item (block 200). The client application 12 prints postage indicia 38 bearing an amount of postage for a mail piece containing the item (block 202). In response to the mail piece being processed via a postal authority 18, such as the USPS, a transmission from the postal authority 18 is received containing a scanned image of the mail piece (block 204). The recipient is then sent a notification 40 that the item has been mailed, wherein the notification 40 includes the free-form description of the item and access to the scanned image (block 206).

According to the exemplary embodiment, the notification 40 sent electronically to the recipient serves as proof that the item has been mailed, and the free-form description allows the recipient to verify described contents of the mail piece prior to delivery and receipt of the mail piece and of the item. Examples of the notification may include email, text message, and an automated phone call.

In one embodiment, blocks 200 and 202 of FIG. 2 are performed by the client application 12 executing on the user's computer 22, while blocks 204 and 206 are performed by servers of the postage indicia service 16. However, in an alternative embodiment, the client application 12 may be implemented as a web service application that is executed on a server of the postage indicia service 16 and accessed from the user's computer 22 via a browser. In this embodiment, blocks 200-206 of FIG. 2 are performed by the postage indicia service 16.

Figure 3A:
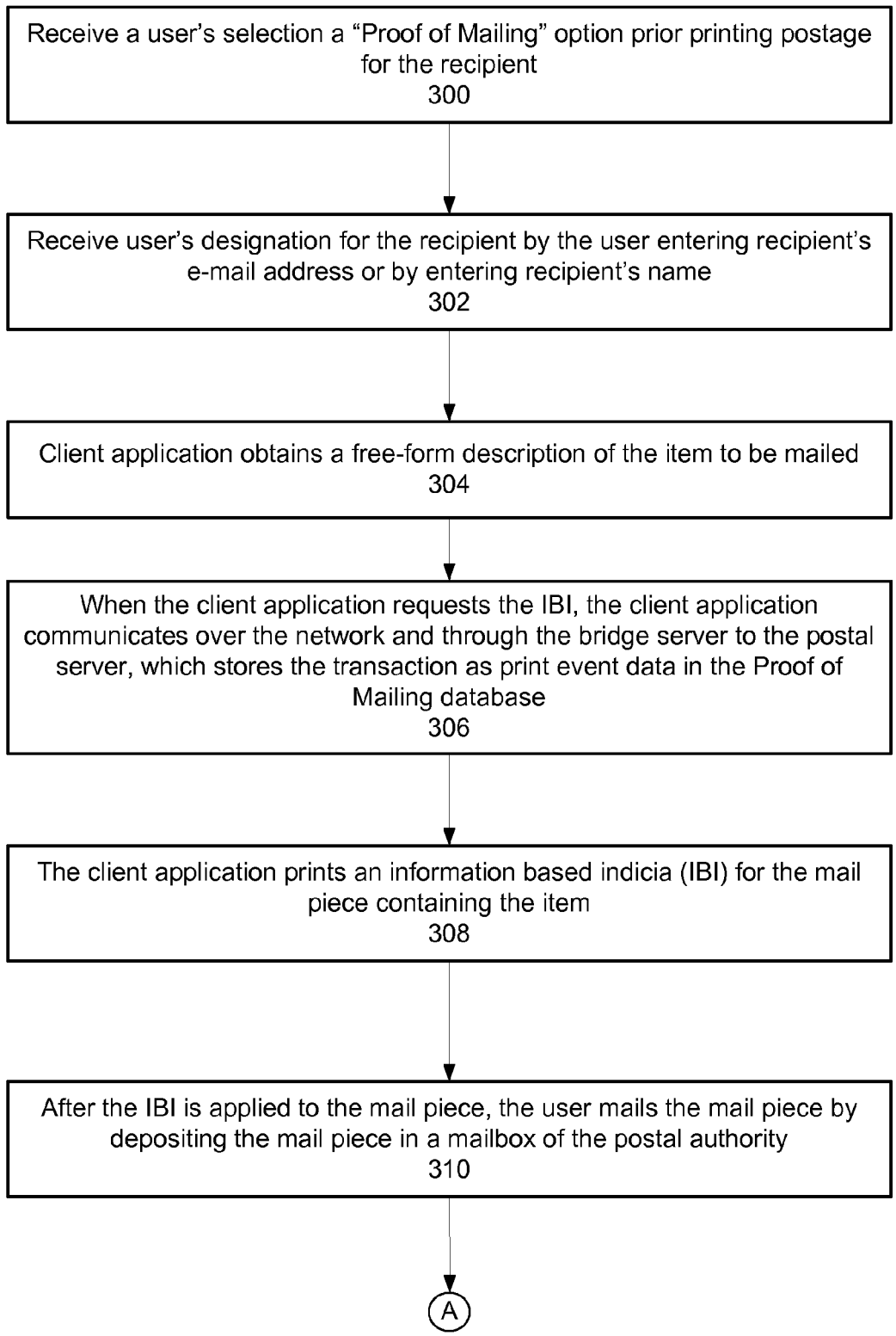
FIGS. 3A and 3B illustrate a flow diagram of the proof of mailing process in further detail.
Figure 3B:
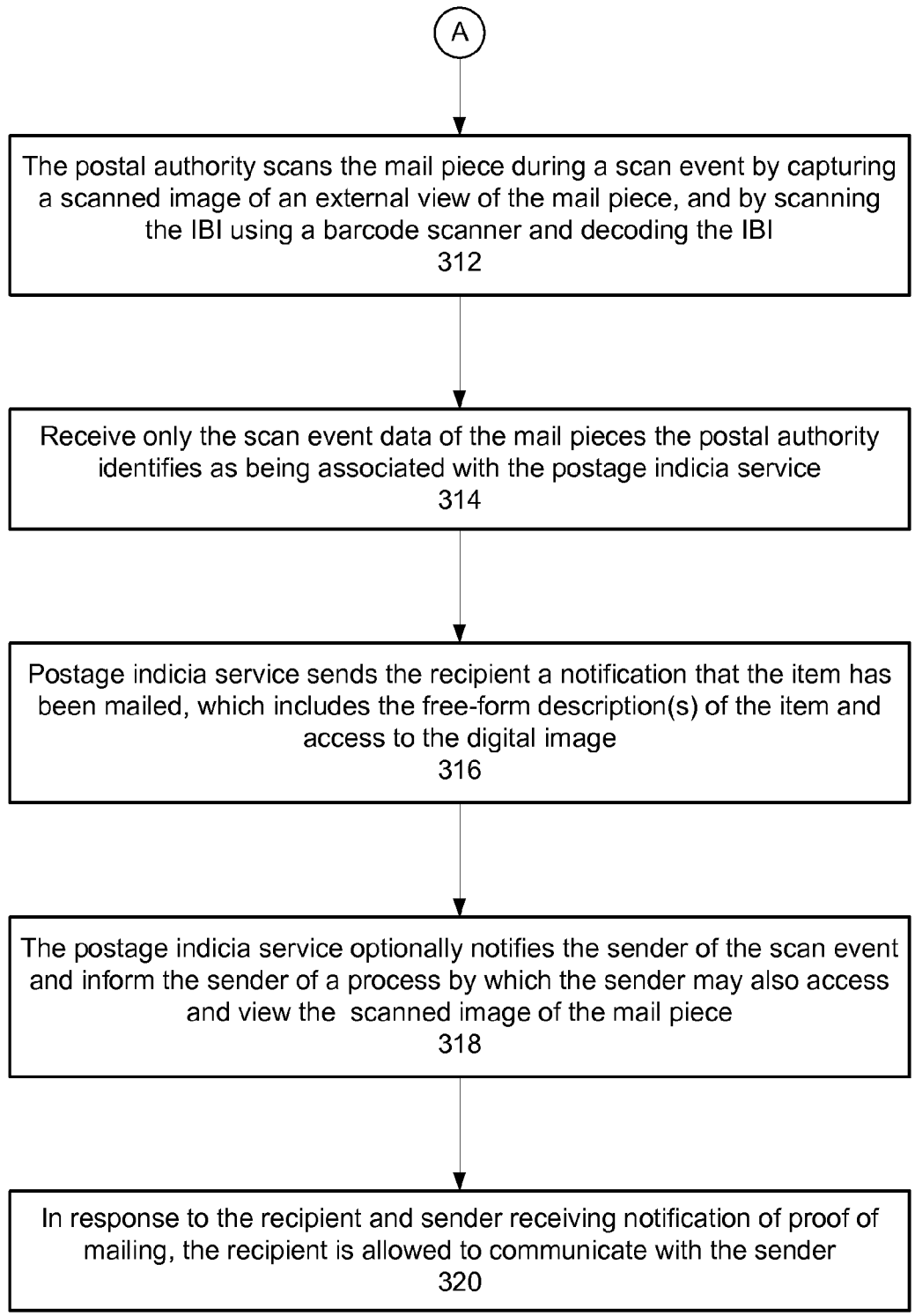

FIGS. 3A and 3B illustrate a flow diagram of the proof of mailing process in further detail. The process may begin by the client application 12 receiving a user's selection a "Proof of Mailing" option prior to printing postage for the recipient (block 300). According to the exemplary embodiment, revenue may be generated based on the Proof of Mailing service. In one embodiment, the postage indicia service 16 may charge fees to the recipient for requesting that an item be mailed with the Proof of Mailing service. In another embodiment, the postage indicia service 16 may generate revenue for volume Proof of Mailing service users by, for example, charging fees to recipients who make more than a predetermined number of requests for the Proof of Mailing service per a predetermined amount of time, e.g., two requests per month.

As part of the Proof of Mailing option, the client application 12 receives the user's designation for the recipient by the user entering or selecting from a list an e-mail address of the recipient, or by entering a name of the recipient, in which case, the client application 12 may retrieve the e-mail address for the recipient from an address book associated with the client application 12 (block 302). In one embodiment, the user designate more than one recipient to receive the notification by providing multiple e-mail addresses.

The client application 12 then obtains a free-form description of the item to be mailed (block 304). In one embodiment, the free-form description is obtained by the client application 12 displaying a text box in a graphical user interface and receiving from the user a free-form text description entered via various computer input devices, such as a keyboard and mouse. Examples of free-form descriptions may include "Check no. 216 for payment of invoice #2452", and "Mailing 3 Land Title Documents", for instance. There are no rules for how the descriptions may be entered or rules for controlling a length of the description. The description is intended to be more descriptive than a generic product, ID, or category name, as used in the case when an item is purchased from an online retailer and the shipment tracked online by the purchaser. The purpose of the free-form description is to allow a sufficiently specific description to allow the recipient to verify that the item the sender claims to be mailing is correct prior to the recipient actually receiving the item.

In another embodiment, the client application 12 with the Proof of Mailing feature is integrated with a third-party application for generating postage within the third-party application. Example types of postage-generating integrated third-party applications include word processing and accounting applications, such as Microsoft (MS) Word™ and Intuit QuickBooks™, for example. Selection of the "Proof of Mailing" feature from within the third-party applications results in postage being printed from the third-party application. In this embodiment, the client application 12 may obtain the free-form descriptions either by input from the user in the third-party application or by information extracted from a database of the third-party application.

In one embodiment, the client application 12 may be integrated with MS Word by having an option within an "Envelope and Labels" feature to allow the user to print postage on envelopes. According to the exemplary embodiment, the "Proof of Mailing" feature may also be integrated with MS Word by providing the "Proof of Mailing" feature as a postage option after the user chooses to print postage. The user may use this feature when mailing different documents to a recipient, for example. Information about the documents gathered from the word processor, such as the number of documents, the number of pages of each document, and the like, may be used in free-form description.

With respect to the accounting application, consider an example where the user acting a vendor is sending ten invoices to a customer. The user/vendor can print postage already setup with the recipient address of the customer known to the accounting application. According to the exemplary embodiment, the user can use the "Proof of Mailing" feature to cause the client application 12 to gather information regarding the invoices, e.g., invoice numbers, date etc., and to use this information to populate the free-form description. Subsequently, a notification 40 will be sent to the customer notifying the customer that the invoices have been mailed. The notification 40 will also contain the description listing the invoices that are being mailed to the customer. If the customer receives the notification 40 and realizes that an additional invoice is due, the customer can contact the vendor and notify the vendor of the discrepancy.

With reference to both FIGS. 1 and 3A, the client application 12 requests postal authority approved information based indicia (IBI) data by communicating over the network 20 and through the bridge server 26 to the postal server 28, and in response, the postal server 28 generates the IBI data and stores the transaction as print event data 42 in the Proof of mailing database 36 (block 306). The stored print event data 42 may include IBI key meter information such as a meter number, an ascending register or a piece count, and a recipient email address.

After the client application 12 obtains the required information from the postal server, the client application 12 prints the postage indicia 38 including PC postage in the form of the IBI for the mail piece containing the item (block 308). The IBI may be printed onto an envelope, a label, or plane paper. In some embodiments, the client application 12 may also print the destination and return addresses. The IBI is typically printed as a 2-D barcode that may include, for example, various types of information including the name and/or other ID of the user, the ID of the postage indicia service 16 and/or the client application 12, an amount of postage, a zip code of the destination, and a date of postage, for example.

After the IBI is applied to the mail piece, the user mails the mail piece by depositing the mail piece in a mailbox or handing the mail piece to a teller or carrier of the postal authority 18 (block 310). The postal authority 18 transfers the mail piece to a distribution center or other processing facilities that scan mail pieces moving through the mail stream. The postal authority distribution center scans the mail piece during a scan event by capturing a scanned digital image of an external view of the mail piece using a wide-field-of-view digital camera, and by scanning the IBI using a barcode scanner to read and decode the IBI through software (block 312). Several scan events may occur for the mail piece as the mail piece traverses the mail stream and is passed from a distribution center to another until a final destination is reached. In an alternative embodiment, the user may scan the mail piece into a kiosk and then drop the mail piece into the kiosk for pickup and processing.

Based on the ID of the postage indicia service 16 in the IBI, only the scan event data 44 (i.e., the scanned digital image and the decoded IBI) of the mail pieces the postal authority identifies as being associated with the postage indicia service 16 are transmitted from the postal authority and received by the postage indicia service 16 (block 314). With reference to the embodiment of FIG. 1, the postal authority 18 transmits the scan event data 44 over the network 20 from a postal authority server 46 to the scanned image server 32 of the postage indicia service 16. The scanned image server 32 then stores the scan event data 44 in the Proof of mailing database 36. The scanned image server 32 may sort the scan event data 44 in the Proof of mailing database 36 based on an ID of the sender and optionally on an ID of the recipient.

In response to receiving the scan event data 44 of the mail piece from the postal authority, the postage indicia service 16 sends the recipient the notification 40 that the item has been mailed, which includes the free-form description(s) of the item and access to the scanned image (block 316). Examples of the notification 40 may include email, text message, and an automated phone call. According to the exemplary embodiment, the notification 40 to the recipient serves as an electronic proof of mailing.

In one embodiment, the notification 40 set to each recipient by the postage indicia service 16 comprises an e-mail message. With reference to the embodiment of FIG. 1, the e-mail notification server 34 automatically generates the e-mail message in response to a signal from the scanned image server 32 that the scan event data 44 has been received and stored in the Proof of mailing database 36. The e-mail notification server 34 then matches the scan event data 44 with the print event data 42 for the corresponding mail piece, which can be matched by the sender, recipient, and IBI information. The e-mail notification server 34 then generates a new e-mail message, accesses the Proof of mailing database 36 and populates the e-mail message with the e-mail addresses of each recipient and the free-form description(s) (user input and/or automatically gathered from a third-party application) listed in the print event data.

Access to the scanned image may be provided in the e-mail message by embedding the scanned image in the body of the e-mail message, including the scanned image as an attachment to the e-mail message, or by including in the e-mail message a link to the scanned image where the scanned image can be viewed via a browser. The e-mail notification server 34 then transmits the e-mail message, and the e-mail message is received by the recipient computer 14.

In the embodiment where a link to the scanned image is provided in the e-mail message, once the recipient clicks on the link to access the scanned image, the recipient may be required to log into a website with an account to access the Proof of Mailing service to view the scanned image. Additionally, the recipient could be charged for the ability to view the scanned image, and/or marketing information could be acquired about the recipient that could be marketed to the sender as well as to the recipient.

The postage indicia service 16 optionally notifies the sender of the scan event and informs the sender of a process by which the sender may also access and view the scanned image of the mail piece (block 318).

In response to the recipient and sender receiving notification of proof of mailing, the recipient is allowed to communicate with the sender (block 320). In one embodiment, the notification 40 sent to the recipient includes contact information by which the recipient can communicate with the sender, such as an embedded E-mail address for example. In another embodiment, the recipient may navigate to a website of the postage indicia service 16 and contact the sender through the website.

To further explain the Proof of Mailing service, consider an example where a customer wishes to send a late payment by check to a vendor and proof of mailing would be highly desirable. The customer may cut the check, by hand or with accounting software, print an envelope with the address of the vendor, which may be known through the accounting software. The client prints postage for the envelope with the "Proof of Mailing" option through the accounting software or client application 12 to automatically notify the vendor that the customer has in fact mailed the check. The customer enters a free-form description describing the check by check number and includes the numbers of the invoices being paid.

Assume further that the vendor's address has changed and the envelope is addressed to the vendor's previous address. In this example, once the vendor receives the proof of mailing via e-mail notification from the postage indicia service 16 containing a description of the check and an image of envelope, the vendor can contact the customer right away to request that the customer both stop payment of the check and to send a new check to the correct address, all before the vendor receives delivery of the original check.

Methods and systems for providing proof of mailing have been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method comprising:
    prior to a user printing postage at a user computer for a mail piece containing an item to be mailed, receiving from the user a designation of a recipient to receive the item, and receiving a free-form description of the item;
    printing by the user computer postage indicia bearing an amount of postage for a mail piece containing the item;
    in response to the mail piece being mailed via a postal authority, receiving by a postage indicia service a transmission from the postal authority containing a scanned image of the mail piece; and
    sending by the postage indicia service a notification to the recipient that the item has been mailed, wherein the notification includes the free-form description of the item and access to the scanned image, and sending the user a notification that the mail piece has been scanned.

2. The method of claim 1 further comprising after sending the recipient the notification that the item has been mailed, allowing the recipient to communicate with the user.

3. The method of claim 1 further comprising receiving the designation of the recipient, receiving the free-form description of the item, and printing of the postage indicia using a client application.

4. The method of claim 3 wherein receiving the free-form description of the item further comprises displaying by the client application a user interface and receiving from the user a free-form text description entered via computer input devices.

5. The method of claim 3 wherein the client application is integrated with a third-party application for generating postage within the third-party application, and wherein the client application receives the free-form description of the item by one of obtaining the free-form description by input from the user within the third-party application, and through information extracted from a database of the third-party application.

6. The method of claim 1 wherein the method comprises a Proof of Mailing service, the method further comprising: generating revenue based on one of charging fees to recipients for requesting that items be mailed with the Proof of Mailing service, and charging fees to the recipients who make more than a predetermined number of requests for the Proof of Mailing service per a predetermined amount of time.

7. The method of claim 1 wherein the postage indicia is encoded and wherein receiving the transmission from the postal authority further comprises: receiving scan event data from the postal authority that includes the scanned image showing an external view of the mail piece, and a decoded postage indicia.

8. The method of claim 7 wherein the postage indicia identifies the postage indicia service, such that only the scan event data of mail pieces identified as being associated with the postage indicia service are received from the postal authority.

9. The method of claim 8 wherein sending the recipient the notification that the item has been mailed further comprises notifying each recipient designated by the user an e-mail message.

10. The method of claim 9 wherein the e-mail message is automatically generated in response to receiving the transmission from the postal authority.

11. The method of claim 9 wherein access to the scanned image is provided by one of embedding the scanned image in a body of the e-mail message, including the scanned image as an attachment to the e-mail message, and by including in the e-mail message a link to the scanned image.

12. A system comprising:
    a computer that is programmed to function to:
      receive from a user a designation of a recipient to receive a mail piece containing an item to be mailed;
      receive a free-form description of the item; and
      print postage indicia bearing an amount of postage for the mail piece; and
    a postage indicia service accessible over a network and in communication with the computer, the postage indicia service functioning to:
      in response to the mail piece being processed by a postal authority, receive a transmission from the postal authority containing a scanned image of the mail piece; and
      send the recipient a notification that the item has been mailed, wherein the notification includes the free-form description of the item and access to the scanned image and send the user a notification that the mail piece has been scanned.

13. The system of claim 12 wherein after sending the recipient the notification that the item has been mailed, the postage indicia service allows the recipient to communicate with the user.

14. The system of claim 13 wherein the computer displays a user interface and receives from the user a free-form text description entered via computer input devices.

15. The system of claim 14 wherein a client application executes on the computer and is integrated with a third-party application for generating postage within the third-party application, and wherein the client application receives the free-form description of the item by one of obtaining the free-form description by input from the user within the third-party application, and through information extracted from a database of the third-party application.

16. The system of claim 12 wherein the system provides a Proof of Mailing service, wherein the postage indicia service generates revenue based on one of charging fees to recipients for requesting that items be mailed with the Proof of Mailing service, and charging fees to the recipients who make more than a predetermined number of requests for the Proof of Mailing service per a predetermined amount of time.

17. The system of claim 12 wherein the postage indicia is encoded and wherein the postage indicia service receives scan event data from the postal authority that includes the scanned image showing an external view of the mail piece, and a decoded postage indicia.

18. The system of claim 17 wherein the postage indicia identifies the postage indicia service, such that only the scan event data of mail pieces identified as being associated with the postage indicia service are received from the postal authority.

19. The system of claim 18 wherein the postage indicia service notifies each recipient designated by the user via an e-mail message.

20. The system of claim 19 wherein the e-mail message is automatically generated in response to the postage indicia service receiving the transmission from the postal authority.

21. The system of claim 19 wherein the postage indicia service provides access to the scanned image in the notification by one of embedding the scanned image in a body of the e-mail message, including the scanned image as an attachment to the e-mail message, and by including in the e-mail message a link to the scanned image.

22. An executable software product stored on a non-transitory computer-readable medium containing program instructions for providing a proof of mailing service, the program instructions for:

prior to a user printing postage at a user computer for a mail piece, receiving from the user a designation of a recipient to receive an item to be mailed, and receiving a free-form description of the item;

printing by the user computer postage indicia bearing an amount of postage for a mail piece containing the item;

in response to the mail piece being processed by a postal authority, receiving by a postage indicia service a transmission from the postal authority containing a scanned image of the mail piece; and sending by the postage indicia service a notification to the recipient that the item has been mailed, wherein the notification includes the free-form description of the item and access to the scanned image, and sending the user a notification that the mail piece has been scanned.

* * * * *